United States Patent [19]
Smith

[11] Patent Number: 5,670,778
[45] Date of Patent: Sep. 23, 1997

[54] PRESENCE DETECTOR FOR MOBILE STORAGE SYSTEMS

[75] Inventor: Jak L. Smith, Parkersburg, W. Va.

[73] Assignee: Kardex Systems, Inc., Marietta, Ohio

[21] Appl. No.: 522,498

[22] Filed: Aug. 31, 1995

[51] Int. Cl.$^6$ ............................................. G01V 8/22
[52] U.S. Cl. ........................ 250/221; 340/556; 312/201
[58] Field of Search ............................. 250/221, 222.1; 340/555, 556, 557, 567; 312/201, 200

[56] References Cited

U.S. PATENT DOCUMENTS

| | | | |
|---|---|---|---|
| 4,384,280 | 5/1983 | Haag | 340/556 |
| 5,225,689 | 7/1993 | Bückle et al. | 250/221 |
| 5,359,191 | 10/1994 | Griesemer et al. | 250/221 |
| 5,408,089 | 4/1995 | Bruno et al. | 250/221 |

*Primary Examiner*—Edward P. Westin
*Assistant Examiner*—Kevin Pyo
*Attorney, Agent, or Firm*—Kane, Dalsimer, Sullivan, Kurucz, Levy, Eisele and Richard, LLP

[57] ABSTRACT

The movable storage system includes a plurality of successive storage units, at least the intermediate storage units being mobile so as to form an access aisle between selected successive storage units. A detector system includes an array of infrared light sources on a lower edge of a first selected storage unit, a reflector on a lower edge of a second selected successive storage unit, and an array of corresponding infrared sensors on an upper edge of the first selected storage unit. Infrared light is directed from the light sources horizontally just above the floor to the reflector and reflected diagonally upward to the infrared sensors thereby detecting the presence or absence of obstructions both near the floor and at upper areas of the access aisle. The light sources and corresponding light sensors are sequentially activated and deactivated to eliminate cross-talk and interference between the various sensors.

5 Claims, 1 Drawing Sheet

5,670,778

PRESENCE DETECTOR FOR MOBILE STORAGE SYSTEMS

BACKGROUND OF THE INVENTION

1. Field of the Invention

The invention pertains to mobile storage systems, and in particular to mobile storage systems having infrared sensors to prevent the movement of a storage unit and closure of an aisle when an object is detected within the aisle.

2. Description of the Prior Art

Mobile storage systems are well known in the prior art which include a plurality of storage units, typically bookcases, wherein the end storage units are stationary and the intermediate units are mounted on rails and include an electric motor or other prime mover to propel the storage units along the rails. Typically the storage units are arranged so that there is sufficient room for a single access aisle within the storage system and the mobile storage units are moved in order to select between which of the storage units the single access aisle is formed. This general configuration is disclosed in U.S. Pat. No. 5,359,191 to Griesemer et al. entitled "Cross-Aisle Photo-Detector for Mobile Storage System Having a Light Detector Mounted to the Movable Storage Unit".

It has been recognized in the prior art, such as in the above Griesemer et al. reference, that these mobile storage units can be very heavy, particularly when full of books or other inventory, and that safety systems are required to prevent the closure of an access aisle between two storage units when a person or other obstacle is between the two storage units. A typical safety system for a mobile storage system uses infrared sensors to determine if a person or other obstacle is between the storage units. However, prior implementations have used infrared beams to scan only the area near the floor. This is deficient in that it does not detect if a person has climbed the shelves and therefore would not be detected by the sensors but would still be susceptible to injury. The Griesemer et al. reference has attempted to address this deficiency by allowing movement of the mobile storage units only if no sensor currently has its light beam interrupted and further if any last sensor detecting an interrupted light beam was at an end or exit from the access aisle. This provides some measure of safety in that if a person walked to the middle of the access aisle and climbed the shelves that the mobile storage units would still be disabled in that the last sensor with an interrupted light beam was an intermediate sensor. While this has provided an additional measure of safety, this has still been found to be inadequate.

The use of additional sensors at various heights would add to the complexity and expense of the system and possibly result in cross-talk or interference among the large number of sensors.

OBJECTS AND SUMMARY OF THE INVENTION

It is therefore an object of the present invention to provide a mobile storage system and safety system therefor which will prevent movement of the mobile storage units if there is an object within the access aisle between two mobile storage units.

It is therefore a further object of the present invention to provide a mobile storage system and safety system therefor which will detect the presence of an object within the access aisle even if the object is not proximate to the floor.

It is therefore a still further object of the present invention to provide a mobile storage system and safety system therefor which is not unduly complicated or expensive.

It is therefore a final object of the present invention to provide a mobile storage system and safety system therefor which is not susceptible to cross-talk or interference among the plurality of sensors.

These and other objects are attained by providing a mobile storage system with stationary end storage units and mobile intermediate storage units mounted on rails. The storage units include a plurality of infrared light sources spaced along a lower portion thereof. The infrared light sources are directed horizontally across the access aisle perpendicularly from the storage unit at a small distance from the floor. The infrared light strikes a reflector on the next successive storage unit across the access aisle. The reflector has a curvature about its vertical plane so that the infrared light is directed diagonally upward to strike a sensor at the top of the same storage unit which includes the infrared light source. The infrared light being initially directed horizontally allows any interruption of the light to detect the presence of objects, such as a person's shoe, near the floor, while the infrared light being subsequently directed diagonally upward allows any interruption of the light to detect the presence of objects at upward locations, such as a person climbing the shelves.

Additionally, in order to prevent cross-talk or interference between the various infrared light sources and sensors, the infrared light sources are sequenced at a high rate so that typically only one infrared light source is on at a time, and the presence or absence of the reflected infrared light is detected by sampling the corresponding sensor.

If any interruption of the light beam is detected indicating that an object is in between the storage units, then the control system disables movement of the movable storage units. Likewise, movement is disabled if the last light beam interrupted, if any, is other than a light beam at an exit of the access aisle.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
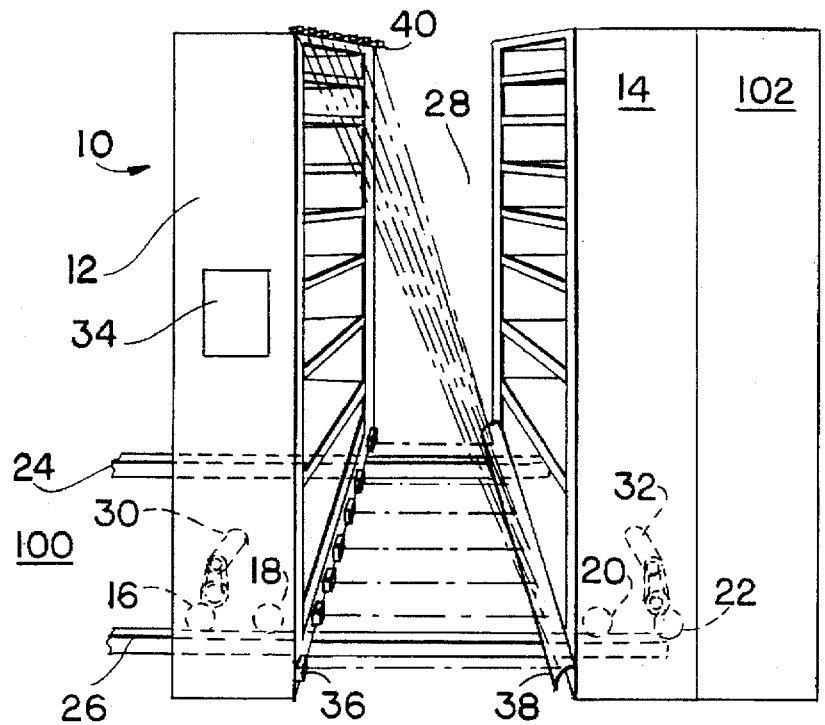
FIG. 1 is a front perspective view of two mobile storage units with an access aisle therebetween of the mobile storage system of the present invention.
Figure 2:
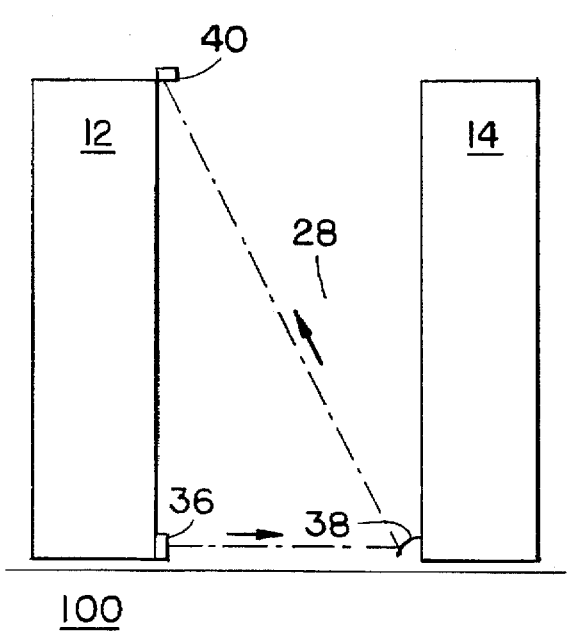
FIG. 2 is a front plan view of two mobile storage units with an access aisle therebetween of the mobile storage system of the present invention.
Figure 3:
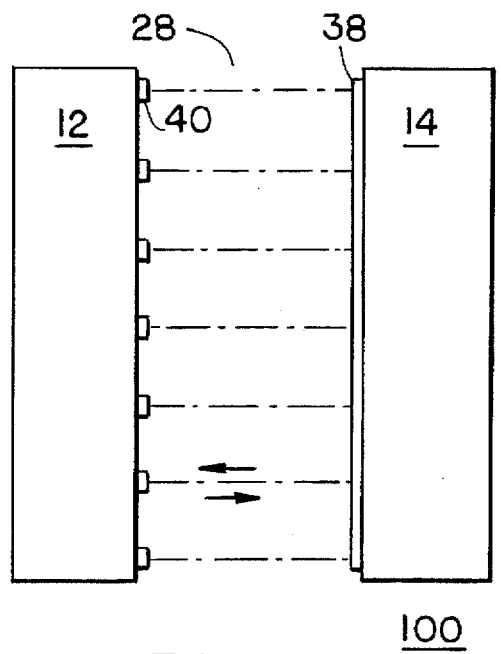
FIG. 3 is a top plan view of two mobile storage units with an access aisle therebetween of the mobile storage system of the present invention.

Referring now to the drawings in detail wherein like numerals refer to like elements throughout the several views, one sees that FIG. 1 is a front perspective view of two storage units 12, 14 configured as bookcases in a mobile storage system 10. Mobile storage system 10 is typically configured of several successive intermediate mobile storage units mobile including drivewheels 16, 22 and idler wheels 18, 20 mounted on a lower side thereof riding on rails 24, 26 which run perpendicularly to storage units 12, 14 and are generally flush with floor 100. Stationary end storage unit or wall 102 is typically placed at an end of mobile storage system. Moreover, mobile storage system 10 can be implemented with as few as one movable storage unit between two stationary storage units and/or walls 102. Of the several storage units, a single successive pair, such as storage units 12, 14 as shown in FIGS. 1–3, is selected to have a separation between them thereby forming an access aisle 28 while the remaining storage units are flush with each other. This results in a great savings in floor space. The access aisle 28 between the selected storage units is formed by moving the storage units, such as 12 and 14, along rails 24 and 26 as propelled by prime movers or electric motors 30, 32 which rotate drive wheels 16, 22, respectively. This allows the contents of any of the storage units to be accessible by the selection of an access aisle between the two desired storage units.

The activation of prime movers or electric motors 30, 32 and subsequent movement of the storage units 12, 14 is controlled by a control unit 34 which, in turn, is responsive to the infrared sensing system which includes infrared light transmitters 36, reflector 38, and infrared light sensors 40.

Infrared light transmitters 36 are placed along a lower portion or base of storage unit 12 a few inches from the floor 100 at intervals of approximately three inches. Infrared light transmitters 36 direct beams horizontally to reflector 38 placed along a lower portion or base of storage unit 14. Reflector 38 is linear along the horizontal plane and has a slight convex curvature in the vertical plane so as to reflect the infrared light beam diagonally upward, as shown in FIGS. 1 and 2, to be detected by an infrared light sensor 40 corresponding to each respective infrared light transmitter 36. The curvature of reflector 38 should be such that reflection from the infrared light transmitter 36 to the infrared light sensor 40 occurs not only in fully open positions of access aisle 28, but also in partially open positions thereof. Assuming that the storage units 12, 14 are of the typical height of six to eight feet, infrared light sensors 40 are placed sequentially along the top of storage unit 12, the same storage unit on which the infrared light transmitters 36 are mounted. However, if the storage units are taller than six to eight feet, such as may be used in a warehouse situation, the infrared light sensors 40 are typically placed at a height of approximately six feet. The horizontal direct path of the infrared light is interrupted if any objects, such as a person's shoe, are on or near the floor, while the diagonally upward reflected path of the infrared light is interrupted if any objects, such as a person climbing the shelves of storage unit 12 or 14, are within the central vertical portions of access aisle 28. Therefore, if any infrared light beams are interrupted, that is, not detected by infrared light sensors 40, then control unit 34 disables the prime movers 30, 32 and does not allow movement of storage units 12 or 14 as a person or other object is determined to be therebetween. Similarly, if the last infrared light beam interrupted is not a light beam within about a foot or so of an entrance or exit to the access aisle 28, then control unit 34 likewise disables the prime movers 30, 32 as it is presumed that an object has entered but not exited access aisle 28, even if the object does not presently interrupt any infrared light beams.

Typically each mobile storage unit 12 or 14 includes infrared light transmitters 36 and sensors 40 on one lateral side thereof (such as the right side as shown in FIG. 1), and further includes reflector 38 on the other lateral side thereof (such as the left side as shown in FIG. 1) in order to provide proper communication with the successive storage unit whether the access aisle 28 is formed on the left or right of the mobile storage unit. Any stationary storage unit or wall includes either reflector 38 or infrared light transmitters 36 and sensors 38 as would be required to provide proper sensing in conjunction with the successive movable storage unit.

To maintain separation of the beams from each other and prevent cross-talk and interference, optical methods may be used such as lenses and apertures to restrict and direct the light from an infrared light transmitter 36 to its respective infrared light sensor 40. Alternately, a broad beam from infrared light sensor 36 can be used and the reflector 38 can be replaced with a series of individual small reflectors, each dedicated to a respective transmitter-sensor pair and directing a portion of the infrared light from the transmitter 36 to respective sensor 40. Another alternative includes using visible light in place of infrared light. Yet another alternative is placing the sensors 40 on the same level of the transmitters 36 while using polarized light (either visible or infrared), implementing reflector 38 as a series of "corner-cube" reflectors which are constructed as a field of small three-sided reflective surfaces positioned 90° from each other (so as to reflect light directly back to its source within its normal wide angle of acceptance and to rotate the polarization of the reflected polarized light by ninety degrees) and using polarizing filters on sensors 40 to determine if the received light has been rotated by the proper amount (thereby discriminating against spurious reflections).

However, the preferred method to prevent cross-talk and interference is to sequence and control infrared light transmitters 36 in a controlled manner by control unit 34. Only one infrared light transmitter 36 and the corresponding infrared light sensor 40 is activated at a time thereby eliminating any interference or cross-talk between the plurality of light beams. If a beam is detected (therefore no object detected by the transmitter-sensor pair), the transmitter-sensor pair is disabled and the next transmitter-sensor pair is activated, repeating until the entire array of transmitter-sensor pairs and corresponding beams are scanned. This is continually repeated. If the absence of an infrared light beam, and therefore the presence of an object, is detected, the scanning stops until the presence of the light beam is detected. Alternately, the scanning could continue with the interrupted beam information being recorded in the memory of control unit 34 and movement of storage unit 12, 14 being disabled until no interruption is detected. In systems with very long storage units, however, more than one transmitter-sensor pair may be activated simultaneously provided that the simultaneously activated transmitters are widely separated from each other in order to increase the speed of scanning while still eliminating cross-talk and interference.

Control unit 34, while scanning the array of transmitter-sensor pairs, can also determine which beam is interrupted and therefore determine the location of the detected object. This information can be used for diagnostics, operator displays, reports or for logic functions. This information may also be used to turn off in-aisle overhead lighting (not shown), reset the storage system logic and allow movement of the storage units 12, 14 when it is determined that a person has left the aisle (all beams unbroken, the last broken beam being within about a foot or so of an exit or entrance to access aisle 28).

Additionally, the exits or entrances to access aisle 28 can be monitored with a secondary aisle entry sensor device (not shown), which operates possibly in the visible light spectrum, which includes two horizontally offset beams at the entrance or exit to determine the direction of people entering or exiting and to count the number of people entering or exiting. Such a secondary aisle entry sensor device would communicate with control unit 34 as an additional source of information. As such a secondary aisle entry sensor device alone is easily fooled by simultaneously entering or exiting people, this source of information is used in addition to the information from sensors 40. If the secondary aisle entry sensor device is implemented, it is typically used to reset the system indicating that movement of storage unit 12 or 14 is allowable.

In order to use mobile storage system 10, the user selects between which two successive storage units the access aisle is desired to be placed in order to provide access to the contents of the storage units. The user then activates the desired prime mover or electric motor to move the desired storage unit(s) along rails 24, 26. The control unit 34 allows the activation of the prime mover or electric motor 30 or 32 only if no object has interrupted the light beams from the various infrared light transmitter-sensor pairs. Additionally, the last interrupted light beam must have been within about a foot or so of an entrance or exit to access aisle 28 indicating that any object previously detected has since exited.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A mobile storage system comprising:
   at least a first movable storage unit;
   an opposing object selected from the group consisting of a wall, a second movable storage unit, and a stationary storage unit;
   a means for transporting said first movable storage unit along a path away from or toward said opposing object to open or close an aisle between said first movable storage unit and said opposing object, said transporting means including wheels on a bottom section of said at least one movable storage unit, said wheels engaging tracks oriented in a direction of said path, at least some of said wheels being driven by an electric motor;
   a detector means comprising:
   a light source means mounted to one of said first movable storage unit and said opposing object,
   a reflecting means mounted to the other of first movable storage unit and said opposing object, said reflecting means comprising a reflector which is linear along a horizontal plane and curved about a vertical plane whereby said reflector reflects light diagonally upward from said light source means to said sensing means while said first mobile storage unit is within a range of distances from said opposing object
   a sensing means vertically offset from said light source means mounted to the same one of said first movable storage unit and said opposing object as said light source means,
   wherein said light source means, said reflecting means and said sensing means are configured so that light is reflected from said light source by said reflecting means to impinge on said sensing means in the absence of an obstacle in a light path from the light source means to the reflecting means or from the reflecting means to the sensing means; and
   means for inhibiting said transporting means in the event light from said light source means does not impinge upon said sensing means.

2. The mobile storage system of claim 1 wherein said light source means includes an array of light transmitters spaced along a lower edge of said first movable storage unit; said reflecting means is mounted along a lower edge of said opposing object and said sensing means includes an array of light sensors spaced along an upper edge of said first movable storage unit.

3. The mobile storage system of claim 2 wherein said detector means further includes a control unit which sequentially activates successive light transmitters in said array of light transmitters.

4. The mobile storage system of claim 3 wherein said control unit further monitors said array of light sensors to determine which light sensor of said array of light sensors was last interrupted and to inhibit said means for transporting in the event that the light sensor last interrupted is a light sensor other than proximate to an exit to said aisle.

5. The mobile storage system of claim 1 wherein said array of light transmitters emits primarily infrared light.

* * * * *